United States Patent
Tsukamoto et al.

[11] Patent Number: 5,853,344
[45] Date of Patent: Dec. 29, 1998

[54] AUTOMATIC TRANSMISSION

[75] Inventors: Kazumasa Tsukamoto, Toyota; Masahiro Hayabuchi; Masaaki Nishida, both of Anjo; Kengo Nomura, Nishio, all of Japan; Takashi Morimoto, Bluxells, Belgium

[73] Assignee: Aisin AW Co., Ltd., Japan

[21] Appl. No.: 675,904

[22] Filed: Jul. 5, 1996

[30] Foreign Application Priority Data

Jul. 6, 1995 [JP] Japan ................................ 7-171178

[51] Int. Cl.⁶ .................................. F16H 3/44; F16H 3/66
[52] U.S. Cl. ........................ 475/269; 475/282; 475/283
[58] Field of Search ................................ 475/269, 271, 475/276, 282, 283

[56] References Cited

U.S. PATENT DOCUMENTS

| | | | |
|---|---|---|---|
| 2,584,468 | 10/1952 | Kelbel | 475/281 |
| 2,827,805 | 3/1958 | Miller | 475/282 |
| 5,006,102 | 4/1991 | Takase et al. | 475/282 |
| 5,133,697 | 7/1992 | Hattori | 475/282 X |
| 5,224,908 | 7/1993 | Nishida et al. | 475/282 X |

FOREIGN PATENT DOCUMENTS

| | | | |
|---|---|---|---|
| 1-141256 | 6/1989 | Japan | 475/281 |
| 2-229946 | 9/1990 | Japan | 475/282 |
| 1/91 | 1/1991 | Japan | 475/283 |
| 1084514 | 4/1984 | U.S.S.R. | 475/282 |

OTHER PUBLICATIONS

Patent Abstracts of Japan, vol. 950, No. 1, 20 Jan 95.
Patent Abstracts of Japan, vol. 11, No. 302, 30 Apr. 87.

*Primary Examiner*—Khoi Q Ta
*Attorney, Agent, or Firm*—Lorusso & Loud

[57] ABSTRACT

Smooth driving of a vehicle is achieved by eliminating busy shift by providing a small gear ratio step between the two highest gear ranges while maintaining structural compactness of the transmission. In the second highest gear range or state, a first pinion P1 has a diameter smaller than that of a second pinion P2, both pinions P1 and P2 being coupled integrally and at least partially determining the second highest gear ratio. The gear ratio $\lambda_2$ in the second highest gear range is described as $1+(Z_{S2}/Z_{R1})\times(Z_{P1}/Z_{P2})$. Since $(Z_{P1}/Z_{P2})$ is always equal to 1.0 or less, the gear ratio can be made smaller without enlarging the diameter of the ring gear R1 significantly to decrease the gear ratio step to the highest gear range.

5 Claims, 6 Drawing Sheets

FIG. 1

Skeleton

Operation Table

| | C1 | C2 | B1 | B2 | B3 | F1 | F2 | Gear Ratio | Step |
|---|---|---|---|---|---|---|---|---|---|
| 1ST | O | | | | △ | | O | 2.07 | 1.6 |
| 2ND | O | | △ | O | | O | | 1.30 | |
| 3RD | O | O | | O | | | | 1.00 | 1.3 |
| REV | | O | | | O | | | 1.41 | |

O: Engagement  △: E/G Brake

FIG. 4

Skeleton

FIG. 5

Operation Table and Gear Ratio

| | C1 | C2 | C3 | B1 | B2 | B3 | B4 | B5 | F1 | F2 | Main Transmission System | Sub-Transmission System | Total | Step |
|---|---|---|---|---|---|---|---|---|---|---|---|---|---|---|
| N | ○ | | | | | | | | | | — | — | — | |
| 1ST | ○ | | | | | △ | | | | ○ | 2.07 | 2.26 | 4.68 | 1.6 |
| 2ND | ○ | | | △ | ○ | | | ○ | ○ | | 1.30 | 2.26 | 2.94 | 1.5 |
| 3RD | ○ | | | △ | ○ | | | ○ | ○ | | 1.30 | 1.48 | 1.92 | 1.5 |
| 4TH | ○ | | ○ | △ | ○ | | | | ○ | | 1.30 | 1.00 | 1.30 | 1.3 |
| 5TH | ○ | ○ | ○ | | | | | | | | 1.00 | 1.00 | 1.00 | |
| REV | | ○ | | | | | ○ | | | | 1.41 | 2.26 | 3.19 | |

○: Engagement    △: When Engine Brake is in Operation

Operation Table

|      | C1 | C2 | B1 | B2 | B3 | F1 | F2 | Gear Ratio | Step |
|------|----|----|----|----|----|----|----|------------|------|
| 1ST  | ○  |    |    |    | △  |    | ○  | 2.43       | 1.7  |
| 2ND  | ○  |    | △  | ○  |    | ○  |    | 1.39       |      |
| 3RD  | ○  | ○  |    | ○  |    |    |    | 1.00       | 1.4  |
| REV  |    | ○  |    |    | ○  |    |    | 2.67       |      |

○: Engagement   △: E/G Brake

FIG. 8

AUTOMATIC TRANSMISSION

BACKGROUND OF THE INVENTION

1. Field of the Invention

The present invention relates to an automatic transmission having a planetary gear unit, in particular, a compact automatic transmission preferably applicable to a vehicle of front engine, front drive (F—F) type. More specifically, the invention relates to the structure of a planetary gear unit with improved steps between gear ratios of transmission ranges.

2. Description of the Prior Art

Figure 6:
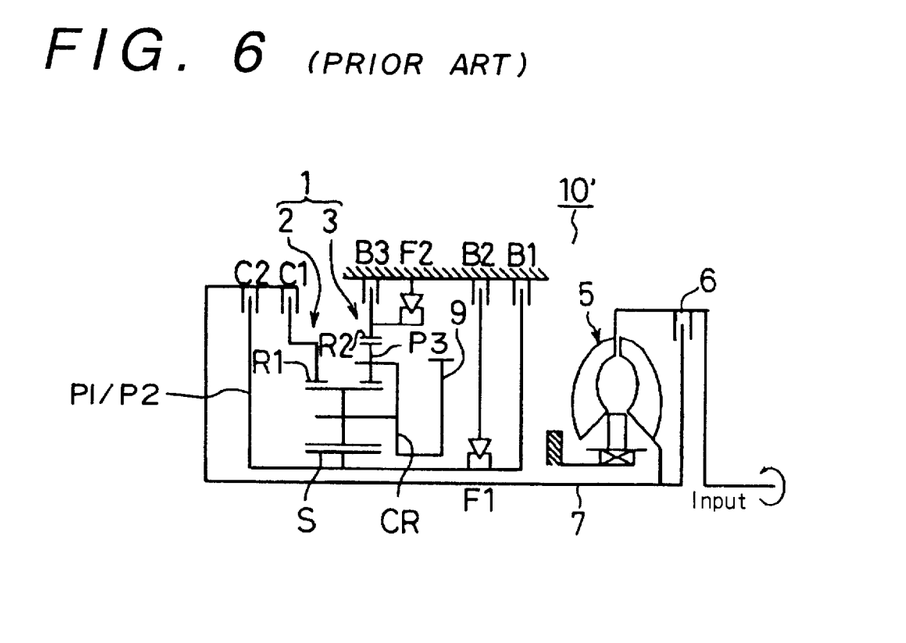
FIG. 6 is a schematic diagram illustrating an automatic transmission system of the prior art.
Figure 8:
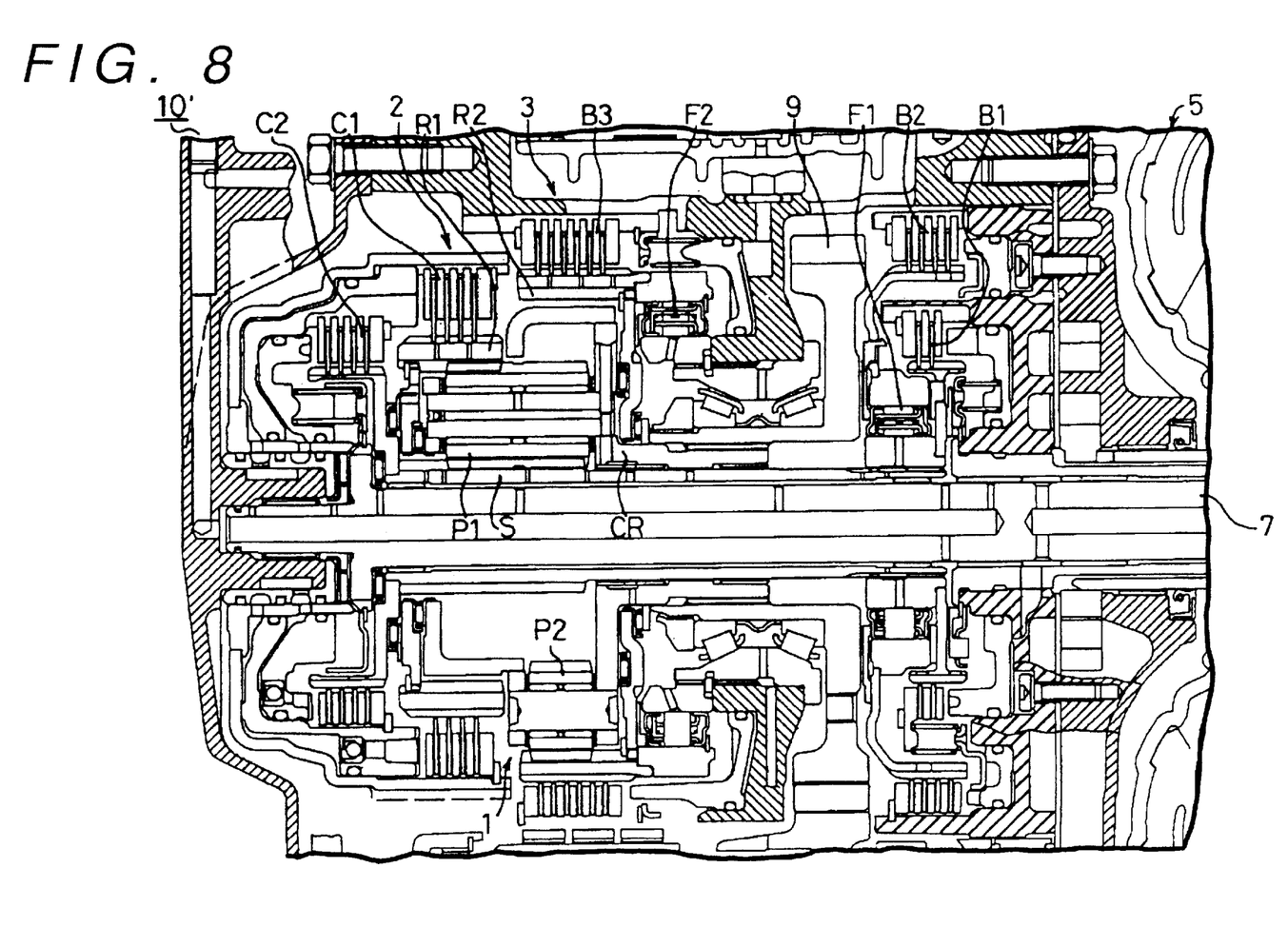
FIG. 8 is a sectional view of the automatic transmission system of FIG. 6.

Hitherto the present applicant has invented an automatic transmission having a planetary gear unit comprising a combination of a simple planetary gear and a double pinion planetary gear as described in Japanese Patent Application Laid Open No. 62-93545 and 7-19297. As illustrated in FIGS. 6 and 8, a planetary gear unit 1 of the automatic transmission has a sun gear S and a carrier CR commonly provided for a simple planetary gear 2 and a double pinion planetary gear 3. A first pinion P1/P2 engages the sun gear S and comprises a long pinion common for the both gears 2 and 3 while a second pinion P3 of the double pinion gear 3 engages the first pinion P1/P2. An input shaft 7 rotated by motive power from an engine (not shown) transmitted via a torque converter 5 or a lock-up clutch 6 is coupled to a ring gear R1 of the simple planetary gear 2 via a forward (first) clutch C1 as well as to the sun gear S via a direct (second) clutch C2. Further, a counter drive gear 9 comprising the output portion of the gear unit is coupled to the carrier CR. The sun gear S can be stopped by a first brake B1 or can be stopped against reverse rotation via a second brake B2 and a first one-way clutch F1 permitting free rotation in the direction in which driving force/rotation is transmitted from the engine to the wheels (hereafter described as positive drive or positive rotational direction). The ring gear R2 of the double pinion planetary gear 3 is stopped against reverse rotation by a second one-way clutch F2 permitting free rotation in the positive drive or positive rotational direction and can be stopped against any rotation by a third brake B3.

Figure 7:
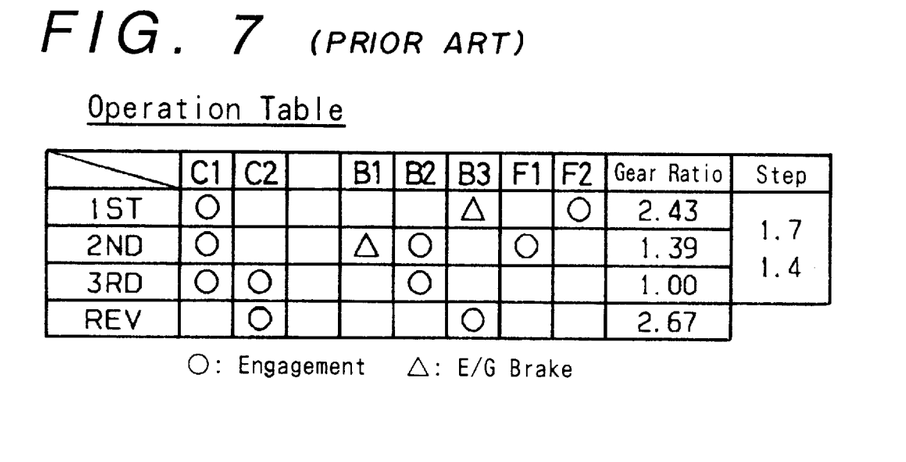
FIG. 7 is a table showing the operation of the automatic transmission system of FIG. 6.

As shown in the operation table of FIG. 7, a main transmission system 10' comprising the above-mentioned planetary gear unit 1 itself provides three forward gear ranges and one reverse gear range. In the first gear range or state (1ST), the forward clutch C1 is connected and the second one-way clutch F2 operates so as to prevent reverse rotation of the ring gear R2 of the double pinion planetary gear 3. In this state, rotation of the input shaft 7 is transmitted to the ring gear R1 of the simple planetary gear 2 via the forward clutch C1, and the ring gear R2 of the double pinion planetary gear is in the stopped state to set the orbiting speed of pinions P1/P2 and P3 to rotate the common carrier CR at a drastically reduced rate in the positive direction while the sun gear S idles in the reverse direction so as to obtain reduced rotational rate from the counter drive gear 9.

In the second gear range or state (2ND), the second brake B2 is operated in addition to the forward clutch C1 to switch one-way operation from the second one-way clutch F2 to the first one-way clutch F1. In this state, reverse rotation of the common sun gear S is stopped by the second brake B2 and the first one-way clutch F1, and thus rotation of the ring gear R1 of the simple planetary gear 2 is transmitted from the input shaft 7 via the forward clutch C1 and orbiting pinion P1/P2 to rotate the carrier CR in the positive direction at a reduced rate relative to the input shaft 7 while idling the ring gear R2 of the double pinion planetary gear in the positive direction so as to obtain a reduced rotational rate but which is greater than the rotational rate of the first gear range from the counter gear 9.

In the third gear range or state (3RD), the direct clutch C2 is engaged in addition to the forward clutch C1. In this state, rotation of the input shaft 7 is transmitted both to the common sun gear S as well as to the ring gear R1 so that the pinion P1/P2 of the simple planetary gear 2 and the carrier CR rotate integrally with the ring gear R1 and sun gear S to transmit lock-up rotation to the counter drive gear 9.

In the reverse gear range or state (REV), the direct clutch C2 and the third brake B3 are engaged. In this state, since rotation of the input shaft 7 is transmitted to the sun gear S via the direct clutch C2 and the ring gear R2 of the double pinion planetary gear is maintained in the stopped state by the third brake B3, the pinions P1/P2, P3 are orbited in the reverse direction to rotate the carrier CR in the reverse direction while the ring gear R1 of the simple planetary gear idles in the reverse direction so as to obtain reverse rotation from the counter gear 9.

As to the operation of the engine brake, the operating state is indicated by triangle marks ($\Delta$) as shown in FIG. 7. In the first gear range or state, the third brake B3 is engaged and the ring gear R2 of the double pinion planetary gear is maintained in the stopped state to prevent forward rotation of the ring gear R2 otherwise permitted by the second one-way clutch F2 when the brake B3 is not engaged and the speed of the output gear exceeds the input speed reduced by the first gear ratio. In the second gear range or state, the first brake B1 is engaged and the common sun gear S is maintained in the stopped state to prevent forward rotation of the common sun gear S otherwise permitted by the one-way clutch F1 if the brake B1 is not engaged while brake B2 is engaged.

A gear ratio $\lambda$ of the above-mentioned gear ranges can be calculated as follows with Z indicating the number of the teeth of the gear and a subscript indicating the gear range: as to the first range, $\lambda_1 = 1 + (Z_{R2}/Z_{R1})$; as to the second range, $\lambda_2 1 + (Z_S/Z_{R1})$; as to the third range, $\lambda_3 = 1$; and as to the reverse range, $\lambda_R = 1 - (Z_{R2}/Z_S)$.

In an automatic transmission system 10' comprising the above-mentioned planetary gear unit 1, torque from the input shaft 7 is transmitted to the ring gear R1 which has a diameter larger than that of the sun gear S; thus, the tangential force applied to the engaged portion of the pinion P1/P2 is smaller compared with the case in which input torque is applied through the sun gear such as a gear unit of a Ravigneaux type, so that bearing and bending stresses acting upon the engaged portions of the gears are smaller. Accordingly, the automatic transmission of FIGS. 6–8 enables obtaining sufficient durability without broadening the width of the teeth. Additionally, the need for an additional motive power transmitting member between the two planetary gears is eliminated since the sun gear is common to both the simple and double planetary gears and the carriers are integrally coupled to each other, consequently reducing the axial dimension to achieve a more compact structure.

On the other hand, the gear ratio $\lambda_2$ of the second gear range (2ND) in the above-mentioned planetary gear unit 1 is determined by the number of teeth of the sun gear S and the ring gear R1 of the simple planetary gear 2, that is, $\lambda_2 = 1 + (Z_S/Z_{R1})$. Accordingly, a smaller number of teeth of the sun gear S, that is, a smaller diameter of the sun gear, or a larger number of teeth of the ring gear R1, that is, a larger diameter of the ring gear is required in order to obtain a second range gear ratio $\lambda_2$ of a smaller value. However, a smaller diameter of the sun gear cannot be achieved since the input shaft passes through the inner diameter of the sun gear. Further a larger diameter of the ring gear R1 would enlarge the radial dimension of the automatic transmission and thus decrease the compactness thereof. Therefore, in the above-mentioned prior art, the gear ratio in the second range is comparatively large so as to achieve a compact structure of the planetary gear unit.

In the third gear range or state (3RD), since the planetary gear unit rotates integrally, the gear ratio $\lambda_3$ is equal to 1.0, and the setting cannot be changed, the proportion of the gear ratio $\lambda_2$ to the gear ratio $\lambda_3$ ($\lambda_2/\lambda_3$), which will be described hereafter as the gear ratio step between the second range and the third range, becomes larger if the gear ratio $\lambda_2$ is comparatively large as mentioned above. In general, a large gear ratio step between two high gear ranges may cause so-called "busy shift", i.e., frequent shifting while driving at a high speed.

That is, when a moderate uphill slope is encountered while driving at a high speed in the third range and the third gear range cannot provide a sufficient motive power, the vehicle slows down so that a shift-down to the second gear range becomes necessary in order to maintain the high speed driving. With a large gear ratio step as in the prior art, the second gear range has a motive power state larger than the motive power sufficient to achieve the high speed driving of the vehicle. Then the vehicle speeds up to a certain high speed driving state causing a shift up to the third range. However as mentioned above, the third range provides insufficient motive power as mentioned above to maintain a certain high speed driving and a down shift to the second range occurs. By repeating such operations, the busy shift occurs.

On the contrary, it would be desirable to have a small gear ratio step so that the motive power does not increase as much as in the above-mentioned prior art when a down shift to the second gear range is carried out and so that the motive power in the second gear range is only sufficient to maintain a certain high speed driving without an increase to a higher speed state so as to avoid an up shift to the third gear range; thus, the above-mentioned busy shift can be prevented and smooth driving of the vehicle can be obtained.

SUMMARY OF THE INVENTION

Therefore a first object of the present invention is to provide a compact automatic transmission which achieves a smaller gear ratio step when shifting between higher gear ranges to prevent busy shift while driving at a high speed to ensure smooth driving of the vehicle.

A second object of the present invention is to provide an automatic transmission wherein the gear ratio relationship between the first range and the reverse range is not ruined by reducing the gear ratio step between higher gear ranges.

The above-mentioned problems are solved by the present invention summarized in an automatic transmission having a planetary gear unit with a plurality of gear states connecting an input member to an output member wherein the planetary gear unit includes first and second planetary pinions wherein the first pinion has a diameter smaller than the second pinion and the first and second pinions are connected so as to rotate integrally. The first pinion engages a first ring gear while the second pinion engages a third pinion which in turn engages a second ring gear. A first sun gear engages the second pinion. A carrier is connected to the output member and supports the first, second and third pinions. A first gear range of the planetary gear unit is achieved by transmitting rotation of the input member to the first ring gear and by stopping the second ring gear. A second gear range is achieved by transmitting rotation of the input member to the first ring gear and by stopping the first sun gear. A third gear range is achieved by rotating the planetary gear unit integrally with the input member.

In a further aspect, the planetary gear unit further includes a second sun gear engaging the first pinion and which can rotate relatively with respect to the first sun gear. A reverse range is achieved by transmitting rotation of the input member to the second sun gear and by stopping the second ring gear.

In a still further aspect the transmission achieves its gear states by including a first clutch interposed between the input member and the first ring gear, a second clutch interposed between the input member and the second sun gear, a first device capable of selectively stopping the first sun gear, and a second device capable of selectively stopping the second ring gear.

In a further embodiment there is provided a sub-automatic transmission system having three forward ranges. The combination of the sub-automatic transmission system with the above-mentioned automatic transmission system achieves five forward ranges and one backward range.

According to the above-mentioned construction in forward gear states, torque from the input member is transmitted to the first ring gear of the planetary gear unit which is selectively set to one of a plurality of the gear ratios to determine the transmission ratio. The torque is transmitted via the carrier to the output member.

In the second gear range or state with the first pinion having a diameter smaller than that of the second pinion and with the first and second pinions being coupled integrally together, the gear ratio ($\lambda_2$) of the second range can be described as $1+(Z_{S2}/Z_{R1})\times(Z_{P1}/Z_{P2})$ with Z indicating the number of teeth of each gear. As ($Z_{P1}/Z_{P2}$) is made less than 1, the gear ratio is made smaller without enlarging the diameter of the first ring gear drastically (i.e., without enlarging $Z_{R1}$).

In the third gear range or state with the planetary gear unit rotating integrally, the gear ratio is equal to 1.0. As the above-mentioned gear ratio of the second gear range becomes smaller, the gear ratio step between the second range and the third range becomes smaller.

The first range gear ratio ($\lambda_1$) can be described as $1+(Z_{R2}/Z_{R1})\times(Z_{P1}/Z_{P2})$ which is smaller compared with the prior art because of the multiplication by ($Z_{P1}/Z_{P2}$) which is less than 1.0. Further, the reverse range gear ratio ($\lambda_R$) can be described as $1-(Z_{R2}/Z_{S1})\times(Z_{P1}/Z_{P2})$, the absolute value of which is similarly smaller because of the multiplication by ($Z_{P1}/Z_{P2}$) which is less than 1.0. Since a smaller diameter of the first pinion results in a larger second sun gear (that is, $Z_{S1}$ becomes larger), ($Z_{R2}/Z_{S1}$) becomes smaller, further making the reverse range gear ratio ($\lambda_R$) smaller.

Accordingly, in general, the smaller a gear ratio difference between the lowest forward range and the reverse range is, the more controllable the automatic transmission becomes. As mentioned above, by making the gear ratio step smaller between higher gear ranges, a first range gear ratio, which is the lowest forward range gear ratio, becomes smaller. Therefore, the absolute value of the reverse range gear ratio step becomes smaller.

Further, although the gear ratio width becomes smaller by making the gear ratio step smaller between higher gear ranges, a gear ratio of sufficient width can be ensured as a whole by providing five forward ranges with a sub-transmission system having three forward ranges. Thus a desirable gear ratio step is obtained in the entire automatic transmission from the lowest range to the highest range.

DETAILED DESCRIPTION OF THE INVENTION

Figure 1:
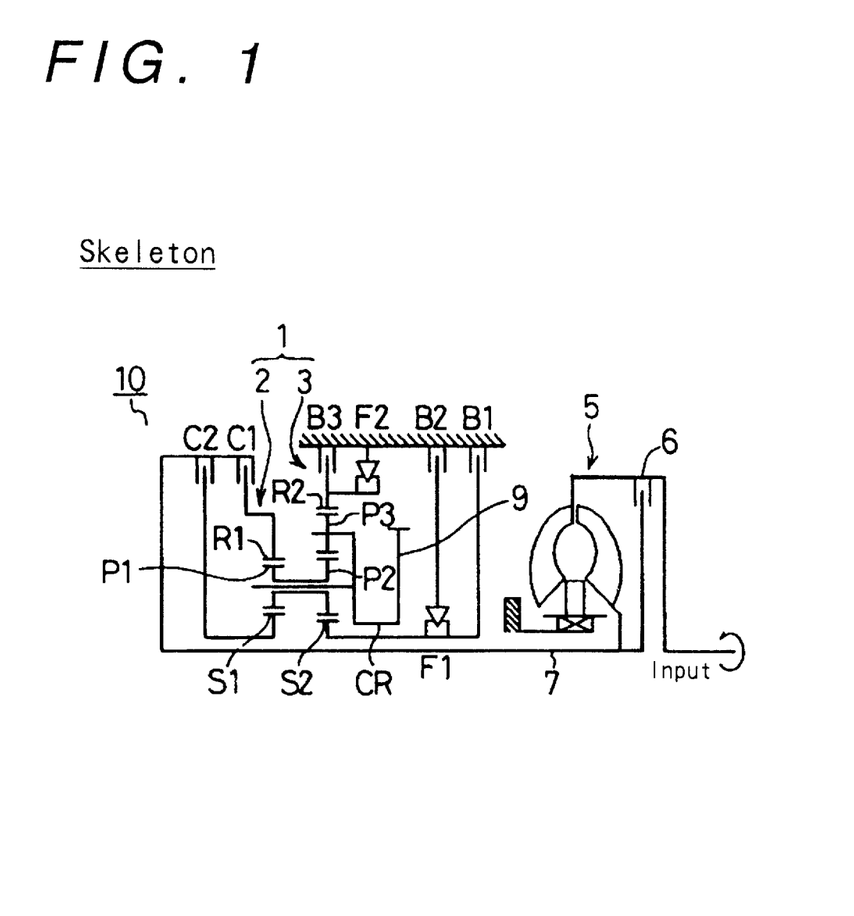
FIG. 1 is a schematic diagram illustrating an automatic transmission system of the present invention.
Figure 2:
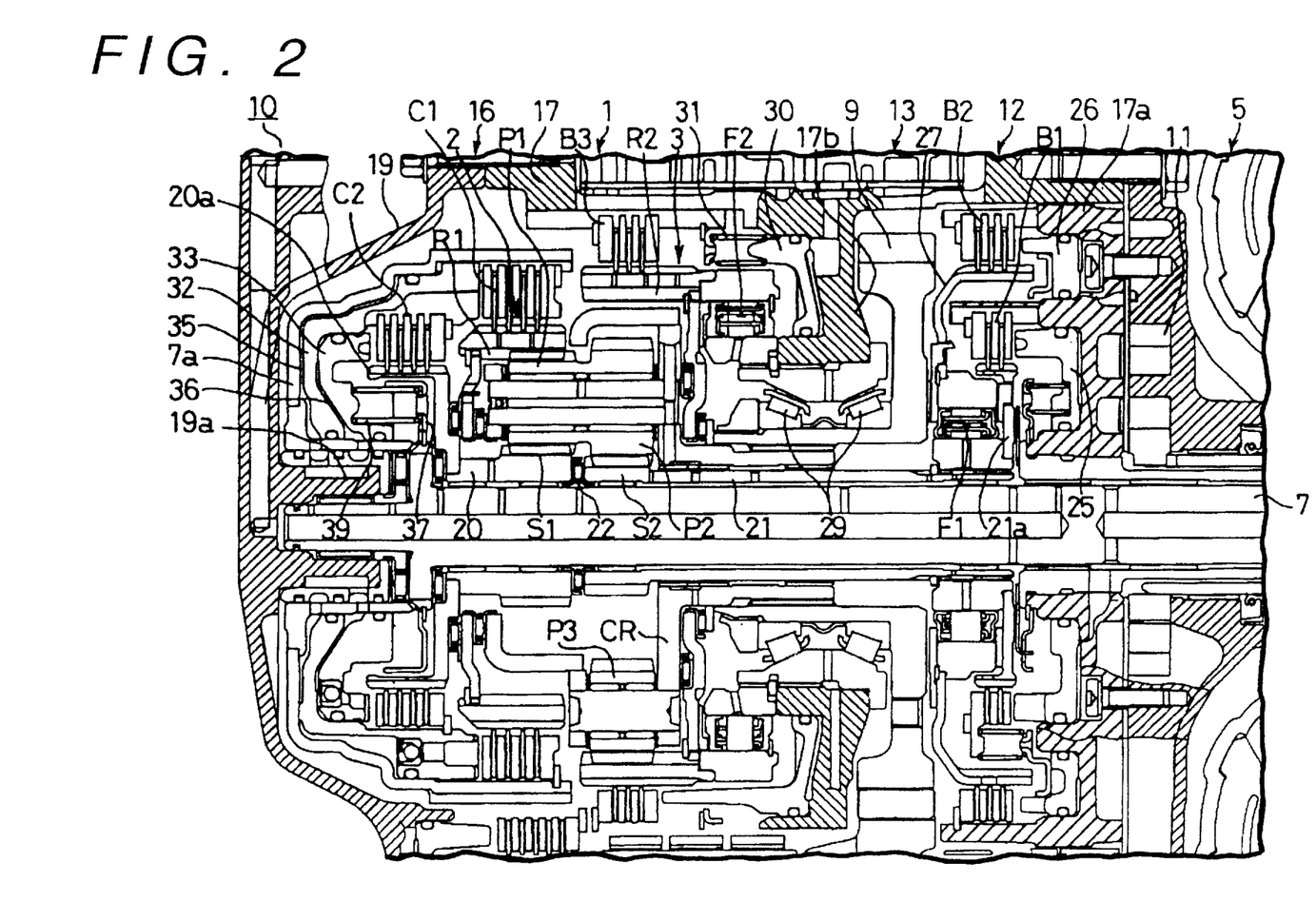
FIG. 2 is a sectional view of the automatic transmission system as shown in FIG. 1.

A main automatic transmission system 10 according to one embodiment of the present invention is illustrated in FIGS. 1 and 2 and is aligned with an engine output shaft. The transmission 10 has an input shaft 7 to which the engine motive power is transmitted via a torque converter 5 having a lock-up clutch 6. On the input shaft 7, there are arranged in order from an oil pump 11 adjacent to the torque converter 5 to the axial rear end, a brake portion 12, an output portion 13, a planetary gear unit portion 1 and a clutch portion 16. These portions are enclosed by an axle case 17 and a rear cover 19 integrally joined.

The planetary gear unit portion 1 comprises a simple planetary gear 2 and a double pinion planetary gear 3. The simple planetary gear 2 comprises a (second) sun gear S1, a first ring gear R1, and a carrier CR supporting a first pinion P1 engaging the gears S1, R1, while the double pinion planetary gear 3 comprises a (first) sun gear S2, a second ring gear R2, a second pinion P2 in engagement with the sun gear S1 and a third pinion P3 in engagement with the ring gear R2 wherein the carrier CR supports the pinions P2, P3 in such a manner that both the pinions P2, P3 are in mutual engagement. The sun gear S1 of the simple planetary gear 2 and the sun gear S2 of the double pinion planetary gear 3 are rotatably supported respectively by the first and second hollow shafts 20, 21 which in turn are supported by the input shaft 7. A thrust bearing 22 is interposed between the both hollow shafts 20, 21 to allow the both shafts 20, 21 to rotate relative to each other. The carrier CR is provided for the both planetary gears 2, 3 in common, the above-mentioned first pinion P1 and the second pinion P2 engaging the sun gears S1, S2 respectively are connected so as to rotate integrally, and the first pinion P1 has a diameter smaller than that of the second pinion P2, namely, a smaller number of teeth $Z_{P1}$. Accordingly, the sun gear S1 of the simple planetary gear 2 engaging the first pinion P1 has a diameter larger than that of the sun gear S2 of the double pinion planetary gear 3 engaging the second pinion P2, that is, $(Z_{S1} > Z_{S2})$.

In the brake portion 12, a first one-way clutch F1, a first brake B1 and a second brake B2 are arranged in order from the radially inner side to the radially outer side. Further hydraulic servos 25, 26 for operating the respective brakes B1, B2 are arranged parallel in the radial direction and are provided adjacent to the brakes B1, B2 respectively in a case 17a which is integrally coupled to the case enclosing the oil pump 11. The first brake B1 is interposed between a flange portion 21a at the edge of the second hollow shaft 21 and an edge portion extending from the pump case 17a. The second brake B2 is arranged between a flange portion 27 extending from an outer race of the first one-way clutch F1 and an edge portion extending from the pump case 17a. The first one-way clutch F1 is arranged between the second hollow shaft 21 and the second brake B2.

The output portion 13 has a counter drive gear 9 supported by bearings 29 on a partition 17b formed on the axle case 17, and the gear 9 is coupled to the carrier CR via a spline. Further, an outer race portion of the bearings 29 extending axially is non-rotatably fixed to the partition 17b. A second one-way clutch F2 is interposed between the fixed extending race portion of the bearing 29 and a coupling portion for coupling the one-way clutch F2 integrally to the ring gear R2 of the double pinion planetary gear 3. Further, a third brake B3 is interposed between the outer periphery of the ring gear R2 and the axle case 17. A hydraulic servo 30 is arranged on one side of the partition 17b and has a piston axially extending like teeth of a comb to control the third brake B3 with a return spring 31 arranged in the teeth-of-a-comb portion.

The clutch portion 16 comprises a forward clutch C1 and a direct clutch C2 located at the edge of the main automatic transmission system 10 extending into a trans-axle rear cover 19 which forms a portion of an integral case. Further, a flange portion 7a is coupled integrally to the input shaft 7 and rotatably mounted on a boss portion 19a formed on the cover 19 for rotatably supporting one end of the input shaft 7. A movable member 32 is fitted in the flange portion 7a, and further, a movable piston member 33 is fitted in the movable member 32. The movable member 32 forms a piston for an oil chamber 35 formed between the peripheral portion of the member 32 and the flange portion 7a. The outer peripheral portion of the movable member 32 is coupled to the flange portion 7a to prevent relative rotation and is opposed to the forward clutch C1 with a slight gap therebetween to form a hydraulic servo for the forward clutch C1. Within the member 32, an oil chamber 36 is formed between the piston portion 33 and the movable member 32. The other side of the piston portion 33 is opposed to the direct clutch C2 to form a hydraulic servo for the direct clutch C2. Further, a spring 39 is located between the piston member 33 and a ring 37 bonded to the input shaft 7 in a compressed state, the spring 39 comprises a return spring commonly provided for the piston members 32, 33 of both hydraulic servos. The forward clutch C1 is interposed between the inner periphery of the radially outer portion of the flange portion 7a and the outer periphery of the ring gear R1 of the simple planetary gear 2, and the direct clutch C2 is interposed between the inner periphery of the movable member 32 and the flange portion 20a connected to the edge of the first hollow shaft 20.

Figure 3:
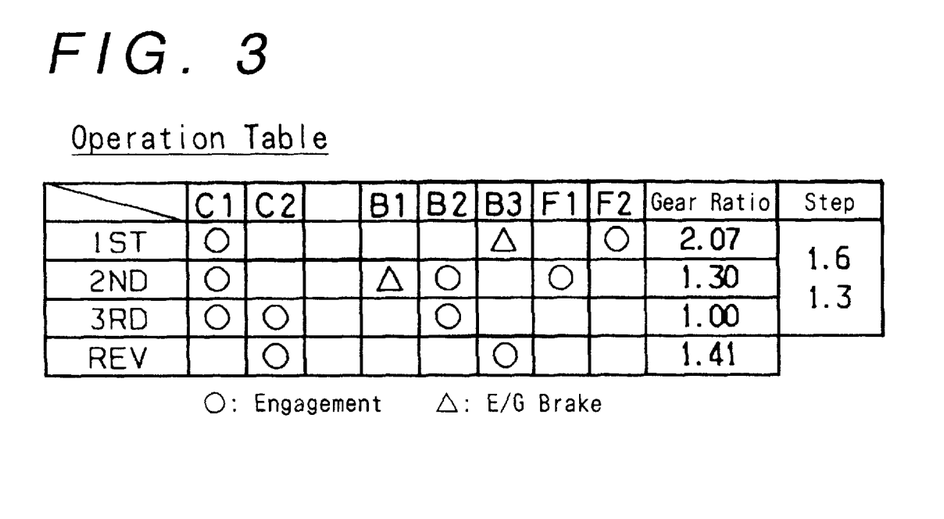
FIG. 3 is a table showing the operation of the automatic transmission system of FIG. 1.

The above-mentioned automatic main transmission system 10 operates in accordance with the operation table as shown in FIG. 3.

In the first gear range or state (1ST), the forward clutch C1 is connected, and the second one-way clutch F2 operates to hold the ring gear R2 of the double pinion planetary gear 3 stopped against reverse rotation. In this state, since rotation of the input shaft 7 is transmitted to the ring gear R1 of the simple planetary gear 2 via the forward clutch C1 and since the ring gear R2 of the double pinion planetary gear 3 is stopped against reverse rotation, the carrier CR rotates at a drastically reduced rate while idling both sun gears S1, S2 in the reverse direction, and the reduced rotation is output by the counter drive gear 9. The gear ratio $\lambda_1$ in the first range state can be described (with Z indicating the number of the teeth of each gear) as $1+(Z_{R2}/Z_{R1})\times(Z_{P1}/Z_{P2})$, which in one example produces a value of 2.07.

In the second gear range or state (2ND), the second brake B2 is in operation in addition to the forward clutch C1 to switch operation from the second one-way clutch F2 to the first one-way clutch F1. In this state, the sun gear S2 of the double pinion planetary gear 3 is stopped against reverse rotation by the second brake B2 and the one-way clutch F1. Thus, rotation of the ring gear R1 of the simple planetary gear 2 transmitted from the input shaft 7 via the forward clutch C1 causes the carrier CR to rotate at a reduced rate in the positive direction while idling the ring gear R2 of the double pinion planetary gear 3 and the sun gear S1 of the simple planetary gear 2 in the positive direction. As a result, the reduced rotation is output by the counter gear 9. The gear ratio $\lambda_2$ in the second range state can be described as $1+(Z_{S2}/Z_{R1})\times(Z_{P1}/Z_{P2})$, which in the one example produces a value of 1.30. In this case, since the first pinion P1 has a diameter smaller than that of the second pinion P2 ($Z_{P1}<Z_{P2}$) and both pinions rotate integrally, the gear ratio $\lambda_2$ can be made smaller than the second gear ratio of the prior art without enlarging the diameter of the ring gear R1 of the simple planetary gear 2 (the number of teeth $Z_{R1}$) because of the multiplication by the term ($Z_{P1}/Z_{P2}$), which is less than one.

In the third gear range or state (3RD), the direct clutch C2 is engaged in addition to the forward clutch C1. In this state, rotation of the input shaft 7 is transmitted to the sun gear S1 as well as to the ring gear R1 of the simple planetary gear 2, causing the gear unit 1 comprising the single and double pinion planetary gears 2, 3 to rotate integrally so that the lock-up rotation is transmitted to the counter drive gear 9 producing a gear ratio $\lambda_3$ equal to 1. Since the above-mentioned second range gear ratio $\lambda_2$ is smaller than in the prior art, the gear ratio step between the second range and the third range becomes smaller accordingly. The example value of the gear ratio step in this case is 1.3, which is smaller than 1.4, a step value in a conventional transmission. Thus, while holding the enlargement of the diameter of the simple planetary gear 2 at the minimal level, the gear ratio step between the two highest gear ranges can be made smaller.

In the reverse gear or state (REV), the direct clutch C2 and the third brake B3 are engaged. In this state rotation of the input shaft 7 is transmitted to the sun gear S1 of the simple planetary gear 2 via the direct clutch C2 and the ring gear R2 of the double pinion planetary gear 3 is stopped by the third brake B3 to idle the ring gear R1 of the simple planetary gear 2 in the reverse direction and the sun gear S2 of the double pinion planetary gear 3 in the positive direction and to rotate the carrier CR in the reverse direction. Thus, the reverse rotation is output by the counter gear 9. The gear ratio $\lambda_R$ in the reverse range state can be described as $1-(Z_{R2}/Z_{S1})\times(Z_{P1}/Z_{P2})$, which in the example produces a value of -1.41.

In general, it is preferable in terms of controllability that the reverse gear range ratio should be equivalent to or less than the first gear ratio. (Since the reverse gear ratio is negative, the comparison should be made as to their absolute values). Since the above-mentioned first gear ratio $\lambda_1$ described as $1+(Z_{R2}/Z_{R1})\times(Z_{P1}/Z_{P2})$ includes multiplication by the term ($Z_{P1}/Z_{P2}$) which is smaller than 1.0, it becomes smaller than the first gear ratio in the prior art. Accordingly, if rotation is input to the sun gear S2 of the double pinion planetary gear 3 during driving in REV as in the prior art, the gear ratio is described as $1-(Z_{R2}/Z_{S2})$. Since the first range gear ratio has become smaller because of the term ($Z_{P1}/Z_{P2}$), the above-mentioned relationship between the first range gear ratio and the reverse range gear ratio is not maintained.

Therefore, by separating the sun gears S1, S2 of the both planetary gears 2, 3 from each other and inputting rotation to the sun gear S1 of the simple planetary gear 2 while driving in reverse, the absolute value of the reverse range gear ratio $\lambda_R$, as well as the first gear ratio, can be made smaller owing to the above-mentioned multiplication by ($Z_{P1}/Z_{P2}$), which is smaller than 1.0. Further, since the sun gear S1 of the simple planetary gear 2 can be formed larger by providing a first pinion P1 with a smaller diameter, ($Z_{R2}/Z_{S1}$) becomes smaller, further making the reverse range gear ratio smaller.

The operating state of the engine brake is denoted by triangle marks as shown in FIG. 3. That is, in the first gear range or state, the third brake B3 is engaged and the ring gear R2 of the double pinion planetary gear 3 is maintained in the stopped state. If the third brake is released, the ring gear R2 can be rotated in the positive direction by the transmission output rotation driven by the vehicle motion exceeding the output rotation produced by operation of the second one-way clutch F2. In the second range state, the first brake B1 is engaged and the sun gear S2 of the double planetary gear 3 is maintained in the stopped state. If the brake B1 is not engaged, the sun gear S2 permitted to rotate in the forward direction by the first one-way clutch F1.

Figure 4:
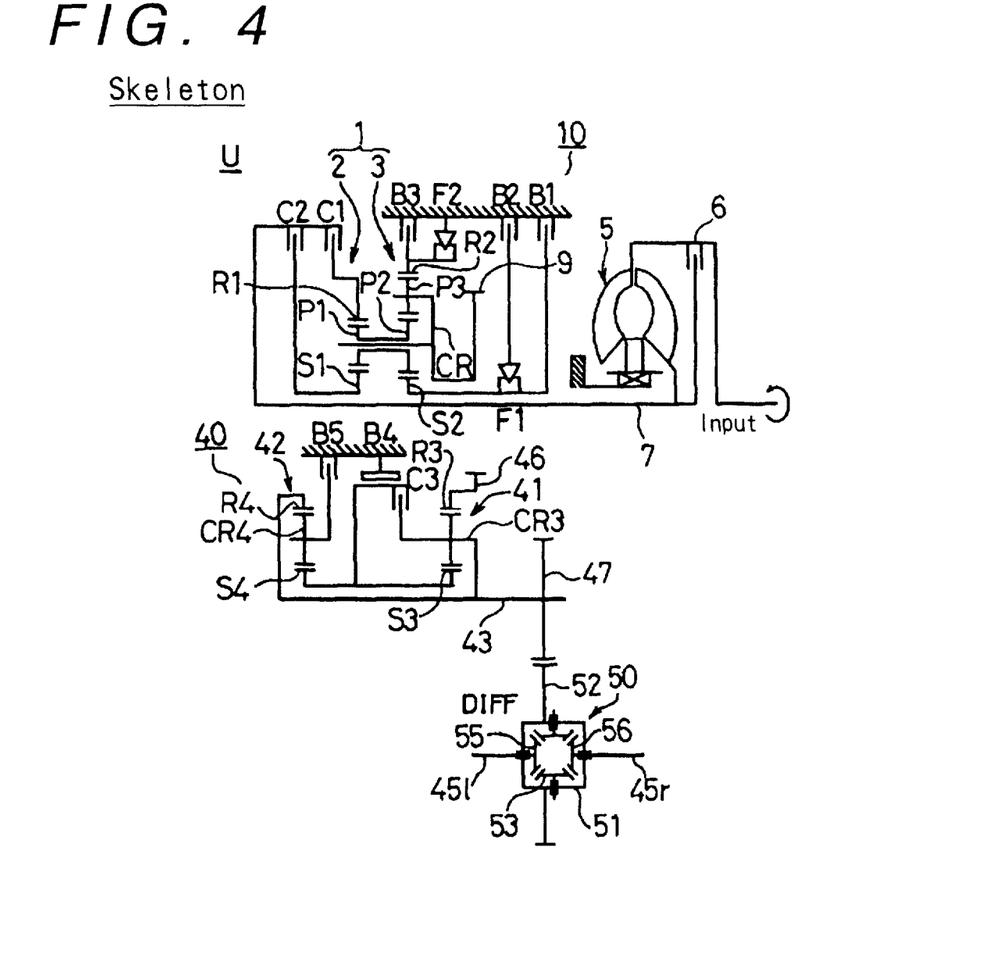
FIG. 4 is a schematic diagram illustrating an automatic transmission having five forward ranges and one reverse range according to the present invention.

As illustrated in another embodiment in FIG. 4, a five forward gear range automatic transmission U in accordance with the invention is formed by combining the above main automatic transmission system 10 and a three range sub-transmission system 40.

The sub-transmission system 40 is arranged on a second shaft (under-drive shaft) 43 located parallel to the first (input) shaft 7. When viewed from their ends, the first and second shafts along with a third shaft position occupied by differential shafts (left and right axles) 45l, 45r form a triangle-like configuration. The sub-transmission system 40 comprises first and second simple planetary gear arrangements 41, 42 including respective carriers CR3, CR4, a ring gear R4 of the second simple planetary gear 42 connected integrally with the carrier CR3 of the first simple planetary gear 41, and sun gears S3, S4 coupled integrally to form a Simpson type gear line. Further, the ring gear R3 of the first simple planetary gear 41 is connected to a counter driven gear 46 meshing with the counter gear 9 to form an input portion to the sub-transmission system, and the carrier CR3 of the first single planetary gear 41 and the ring gear R4 of the second simple planetary gear 42 are coupled to a reduction gear 47, which provides an output portion. Further, an under-drive (UD) direct clutch C3 is interposed between the carrier CR3 of the first planetary gear 41 and the integral sun gears S3, S4, and the integral sun gear S3, S4 can be selectively stopped by the fourth brake B4, while the carrier CR4 of the second single planetary gear 42 can be selectively stopped by the fifth brake B5. Accordingly, the sub-transmission system 5 can provide three forward ranges.

A differential device 50 in the third corner of the triangular configuration is provided with a differential case 51 on which is fixed a gear 52 engaging the above-mentioned reduction gear 47. Differential gears 53 and left and right side gears 55, 56 are mutually engaged and rotatably supported inside the differential case 51 with the left and right axles 45l, 45r arranged to extend from the left and right side gears 55, 56. Accordingly, rotation from the gear 52 is distributed to the left and right wheels via the left and right axles 45l, 45r according to the loaded torque applied to the wheels.

Figure 5:
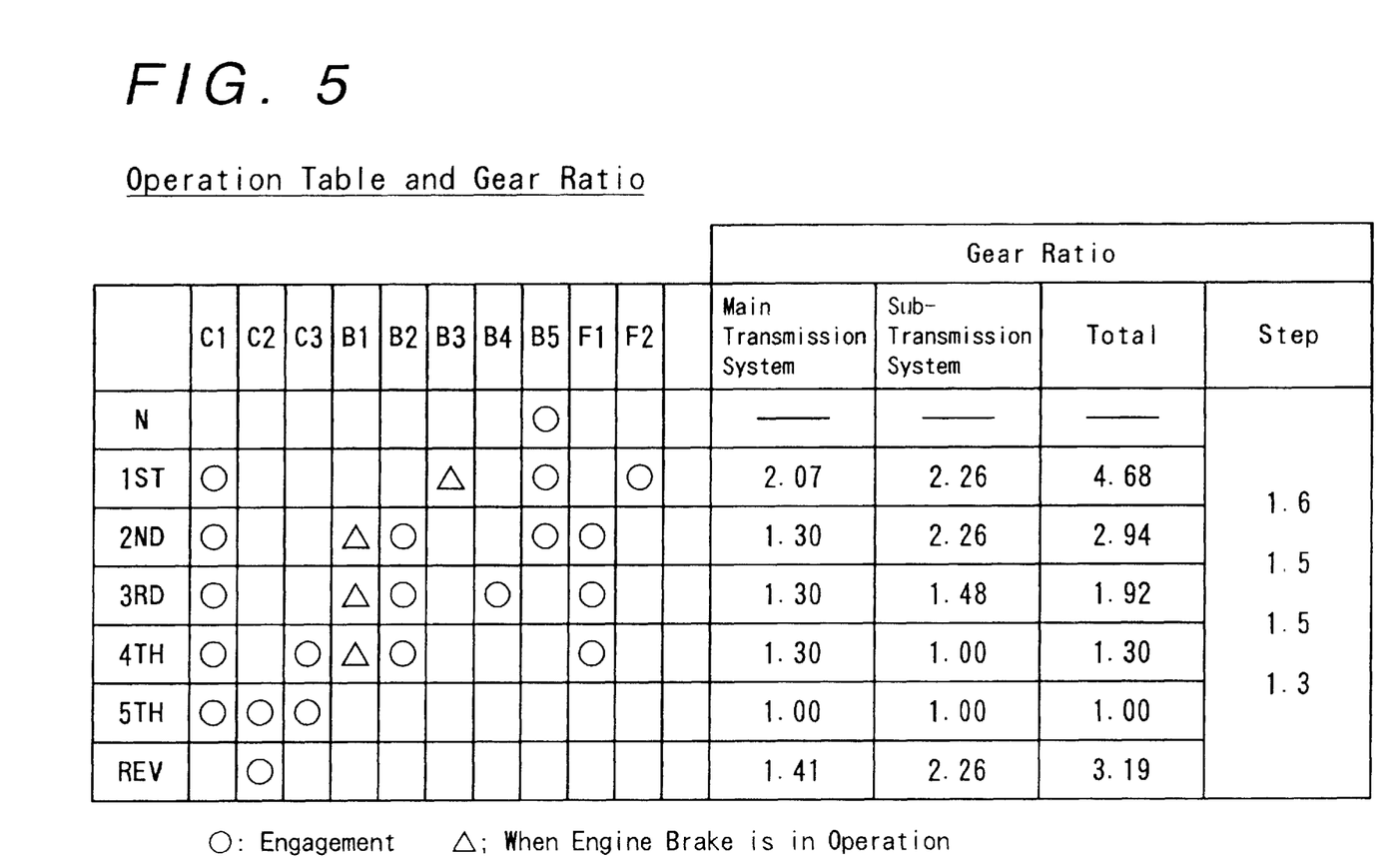
FIG. 5 is a table showing the operation of the automatic transmission of FIG. 4.

Operation of the five range automatic transmission U is explained with reference to the operation table as shown in FIG. 5. In the first gear range or state (1ST), the forward clutch C1, the second one-way clutch F2 and the fifth brake B5 are engaged. Accordingly, the main transmission system 10 is brought into the first gear range or state, and the reduced rotational rate is transmitted to the ring gear R3 of the first simple planetary gear 41 in the sub-transmission system 40 via the counter gears 9, 46. The sub-transmission system 40 is in its first gear range or state with the carrier CR4 of the second simple planetary gear 42 stopped by the fifth brake B5, and the above-mentioned reduced rotational rate of the main transmission system 10 is further reduced by the sub-transmission system 40 to be transmitted to the axles 45l, 45r via the gears 47, 52 and the differential device 50.

In the second gear range or state (2ND), the second brake B2 is engaged in addition to the forward clutch C1, and operation is switched from the second one-way clutch F2 to the first one-way clutch F1 smoothly. Then, the main transmission system 10 is brought into the second range state as mentioned above. Further, the sub-transmission system 40 is in its first gear range or state owing to the engagement of the fifth brake B5, and the combination of the second gear range or state or the main transmission system 10 and the first gear range or state of the sub-transmission system 40 provides the second gear range or state in the automatic transmission U as a whole.

In the third gear range or state (3RD), the main transmission system 10 is in its second gear range or state with the forward clutch C1, the second brake B2 and the first one-way clutch F1 engaged, and the sub-transmission system 40 is in its second gear range or state with the fourth brake B4 in engagement. Then, the sun gears S3, S4 of the first and second simple planetary gears 41, 42 are fixed, and rotation from the ring gear R3 of the first simple planetary gear 41 is output from the carrier CR3 as the second range rotation. As a result, the combination of the second gear range or state in the main transmission system 10 and the second gear range or state in the sub-transmission system 40 provides the third gear range or state in the automatic transmission U as a whole.

In the fourth gear range or state (4TH), the main transmission system 10 is in its second range with the forward clutch C1, the second brake B2 and the first one-way clutch F1 engaged, and the sub-transmission system 40 is in its third gear range or state with the fourth brake B4 released and the UD direct clutch C3 engaged. In this state, the clutch C3 locks the carrier CR3 to the sun gears S3, S4 which in turn locks the ring gear R3 of the first simple planetary gear 41 and to the carrier CR3 and output gear 47 to provide lock-up rotation, namely, to cause both planetary gears 41, 42 to rotate integrally. Accordingly, the combination of the second gear range or state in the main transmission system 10 and the lock-up or third state of the sub-transmission system 40 provides the fourth gear range or state in the automatic transmission U as a whole.

In the fifth gear range or state (5TH), the forward clutch C1 and the direct clutch C2 are engaged, and rotation of the input shaft 7 is transmitted to the ring gear R1 of the simple planetary gear and the sun gear S1 so that the main transmission system 10 is brought into its lock-up or third state, causing the gear unit 1 to rotate integrally. Further, the sub-transmission system 40 is also in its lock-up or third state with the UD direct clutch C3 engaged. Thus, the combination of the third gear range or state (lock-up) of the main transmission system 10 and the third gear range or state (lock-up) of the sub-transmission system 40 provides the fifth range gear range or state in the automatic transmission U as a whole.

In the reverse gear range or state (REV), the direct clutch C2 and the third brake B3 are engaged as well as the fifth brake B5 is engaged. In this state, in the main transmission system 10, reverse rotation is output as mentioned above. In the sub-transmission system 40, the carrier CR4 of the second planetary gear 42 is stopped by the engagement of the fifth brake B5 and the sub-transmission system 40 is maintained in its first gear range or state. Accordingly, the combination of the reverse rotation of the main transmission system 10 and the first gear range of the sub-transmission system 40 provides reduced rotational output in the reverse direction.

In FIG. 5, as in FIG. 3, the operating state of the engine brake is denoted by triangle marks. That is, in the first range state, the third brake B3 is engaged to fix the ring gear R2 of the double pinion planetary gear 42 instead of the second one-way clutch F2. In the second, third, and fourth range states, the first brake B1 is engaged to fix the sun gear S2 of the double pinion planetary gear 42 instead of the first one-way clutch F1.

Since the fourth and fifth range gear ratio steps are obtained by shifting the main transmission system 10 between its second and third gear ranges, gear ratio steps as shown in FIG. 5 are small as mentioned above, and a smaller gear ratio step between higher gear ranges provides a small gear ratio width. However, by compensating such gear ratio width with the combination of the sub-transmission system 40 which increases the number of forward gear ranges up to five, a desirable gear ratio steps are maintained from the lowest gear range to the highest gear range in the automatic transmission U as a whole. Gear ratios and steps are not limited to the values as shown in the Tables, but can be adjusted within any desired range.

The planetary gear unit does not need to include the sun gear S1 (the second sun gear) of the simple planetary gear if the above-mentioned desirable gear ratio can be disregarded for driving in reverse. In this case, the direct clutch C2 is interposed between the input shaft 7 and the sun gear S2 (the first sun gear) of the double pinion planetary gear so that rotation is input to the sun gear S2 during reverse driving.

The sub-transmission system is not limited to the above-mentioned Simpson type but can be realized in the form of a different shifting gear system. Also, it is not limited to those providing three forward ranges but can be realized in the form of a sub-transmission system providing two forward ranges in combination with the main automatic transmission system, thus achieving a four range automatic transmission as a whole. Further it is also possible to provide a sub-transmission system exclusively for reduction.

As heretofore mentioned, since the carrier is connected to the output member and torque from the input member is input to the first ring gear in driving forward, a compact structure can be achieved as in the prior art. On the other hand, a smooth driving of the vehicle can be realized without causing busy shift in driving at a high speed by providing a small gear ratio step at a higher range side based on the structure that a first pinion has a diameter smaller than that of a second pinion having a small gear ratio in the second range state.

Further, in spite of the fact that the gear ratio in the first range state becomes smaller by providing a smaller gear ratio in the second range state and since torque from the input member is input to the second sun gear in the reverse range state, the first and second sun gears can be separated from each other to allow relative rotation thereof and the reverse range gear ratio can be set at a small value. Thus the gear ratio relationship between the first range and the reverse range is not ruined so as not to deteriorate controllability.

Further, by achieving an automatic transmission providing five forward ranges and one backward range as a whole by using a combination with a sub-transmission system having three forward ranges, a smaller gear ratio step is obtained between the higher gear ranges as mentioned above. Thus, the entire gear ratio steps can be improved, compensating for gear ratio widths which are too small.

What is claimed is:

1. An automatic transmission comprising an input member to which motive power is applied, an output member from which the motive power is transmitted, and a planetary gear unit connecting the input member to the output member, wherein rotation from the input member is output to the output member via one of a plurality of transmission gear states of the planetary gear unit, said planetary gear unit comprising a first ring gear, a first pinion engaging the first ring gear, a second pinion coupled to the first pinion so as to rotate integrally therewith, a third pinion engaging the second pinion, a second ring gear engaging the third pinion, a first sun gear engaging the second pinion, a carrier coupled to the output member and supporting the first, second and third pinions, said first pinion having a diameter smaller than that of said second pinion, and gear state setting means for achieving a first gear state range by transmitting rotation of the input member to the first ring gear and by stopping the second ring gear, for achieving a second range by transmitting rotation of the input member to the first ring gear and by stopping the first sun gear, and for achieving a third range by rotating the planetary gear unit integrally with the input member, said smaller diameter of the first pinion relative to the diameter of the second pinion producing reduced output gear ratio in said first and second gear states.

2. The automatic transmission according to claim 1, wherein the planetary gear unit further comprises a second sun gear engaging the first pinion and which can rotate relative to the first sun gear, and gear state setting means achieves a reverse range by transmitting rotation of the input member to the second sun gear as well as stopping the second ring gear.

3. The automatic transmission according to claim 2, wherein said gear state setting means includes a first clutch interposed between the input member and the first ring gear, a second clutch interposed between the input member and the second sun gear, a first stopping means capable of selectively stopping the first sun gear, and a second stopping means capable of selectively stopping the second ring gear.

4. The automatic transmission according to claim 1, further comprising a sub-automatic transmission system connected with said planetary gear unit and having three forward gear ranges, said gear state setting means operating said planetary gear unit and said sub-automatic transmission system to achieve five forward gear ranges and one reverse gear range as a whole.

5. The automatic transmission according to claim 3, further comprising a sub-automatic transmission system connected with said planetary gear unit and having three forward gear ranges, said gear state setting means operating said planetary gear unit and said sub-automatic transmission system to achieve five forward gear ranges and one reverse gear range as a whole.

* * * * *

UNITED STATES PATENT AND TRADEMARK OFFICE
CERTIFICATE OF CORRECTION

PATENT NO. : 5,853,344
DATED : December 29, 1998
INVENTOR(S) : TSUKAMOTO et al

Page 1 of 2

It is certified that error appears in the above-indentified patent and that said Letters Patent is hereby corrected as shown below:

IN THE DRAWINGS: Please substitute the attached Fig. 6 for Fig. 6 as printed.

Col. 2, line 40, "$\lambda_2 1+$" should read --$\lambda_2=1+$--.

Col. 8, line 9, delete "both"; and
line 10, delete "gears" insert --gear units--.

Signed and Sealed this

Twenty-first Day of November, 2000

Attest:

Q. TODD DICKINSON

Attesting Officer        Director of Patents and Trademarks

FIG. 6  PRIOR ART

FIG. 7  PRIOR ART

Operation Table

|      | C1 | C2 | B1 | B2 | B3 | F1 | F2 | Gear Ratio | Step |
|------|----|----|----|----|----|----|----|------------|------|
| 1ST  | O  |    |    |    | △  |    | O  | 2.43       | 1.7  |
| 2ND  | O  |    | △ | O  |    | O  |    | 1.39       | 1.4  |
| 3RD  | O  | O  |    | O  |    |    |    | 1.00       |      |
| REV  |    | O  |    |    | O  |    |    | 2.67       |      |

O: Engagement   △: E/G Brake